United States Patent
Nakaizumi

(10) Patent No.: US 10,625,693 B2
(45) Date of Patent: Apr. 21, 2020

(54) WIRE ROUTING MEMBER AND WIRE ROUTING STRUCTURE

(71) Applicant: SUMITOMO WIRING SYSTEMS, LTD., Yokkaichi-shi, Mie (JP)

(72) Inventor: Takuya Nakaizumi, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 16/492,915

(22) PCT Filed: Feb. 23, 2018

(86) PCT No.: PCT/JP2018/006690
§ 371 (c)(1),
(2) Date: Sep. 10, 2019

(87) PCT Pub. No.: WO2018/168398
PCT Pub. Date: Sep. 20, 2018

(65) Prior Publication Data
US 2020/0062197 A1    Feb. 27, 2020

(30) Foreign Application Priority Data
Mar. 16, 2017    (JP) ................. 2017-051300

(51) Int. Cl.
*B60R 16/02* (2006.01)
*H02G 3/04* (2006.01)
(Continued)

(52) U.S. Cl.
CPC ....... *B60R 16/0215* (2013.01); *H01B 17/583* (2013.01); *H02G 3/0481* (2013.01); *H02G 3/22* (2013.01)

(58) Field of Classification Search
CPC .... B60R 16/0215; H02G 3/0481; H02G 3/22; H01B 17/583; H01B 7/0045
(Continued)

(56) References Cited

U.S. PATENT DOCUMENTS 5,526,549 A * 6/1996 Mori ................... F16L 5/02
16/2.1
6,010,369 A * 1/2000 Itabashi ............... H01R 13/025
439/660
(Continued)

FOREIGN PATENT DOCUMENTS

JP    2012-056368 A    3/2012
JP    6063840 B2       1/2017

OTHER PUBLICATIONS

Mar. 20, 2018 International Search Report issued in International Patent Application No. PCT/JP2018/006690.
(Continued)

*Primary Examiner* — Sherman Ng
(74) *Attorney, Agent, or Firm* — Oliff PLC

(57) ABSTRACT

A wire routing member includes a cylindrical main body that is arranged at an end of an exterior cladding member collectively covering a plurality of wires. Partitioning walls that partition routing spaces for the respective wires are provided inside the main body, each partitioning wall projecting in a cantilever shape radially inward from an inner circumferential surface of the main body. The routing spaces are continuous with each other via a space at which inner ends of the partitioning walls face each other, such that the wires can pass through the space at which the inner ends of the partitioning walls face each other. The main body includes a split groove through which the wires can be inserted into one of the plurality of routing spaces.

5 Claims, 9 Drawing Sheets

(51) Int. Cl.
*H01B 17/58* (2006.01)
*H02G 3/22* (2006.01)

(58) Field of Classification Search
USPC ........................................ 174/72 A
See application file for complete search history.

(56) References Cited

U.S. PATENT DOCUMENTS

2013/0269981 A1* 10/2013 Shiga ................ B60R 16/0215
174/136
2015/0041175 A1 2/2015 Nakai et al.
2017/0076841 A1 3/2017 Nakai et al.

OTHER PUBLICATIONS

May 28, 2018 International Preliminary Report on Patentability issued in International Patent Application No. PCT/JP2018/006690.

* cited by examiner

WIRE ROUTING MEMBER AND WIRE ROUTING STRUCTURE

This invention relates to a wire routing member and a wire routing structure.

BACKGROUND

Patent Publication JP 6063840 discloses a wire alignment structure including (i) a tubular member, (ii) a plurality of wires inserted into the tubular member and having a drawn-out section drawn out of an end opening of the tubular member, (iii) a terminal metal fitting connected to a tip end of the drawn-out section of each wire, and (iv) an alignment tool positioned between an end of the tubular member and the terminal metal fitting to align each wire. By having the drawn-out section of each wire aligned by the alignment tool, the drawn-out section can automatically come to a position in which it can connect with a counterpart terminal to which the terminal metal fitting corresponds. Connection work between the terminal metal fitting and the counterpart terminal can be performed without any problems.

SUMMARY

Incidentally, for example, when trying to draw each wire in to the inside of the vehicle via a hole of a vehicle body, according to the above structure, there was a possibility that an alignment tool gets caught on the vehicle body and cannot pass through the hole. Additionally, if the alignment tool is positioned at a tip of the drawn-out section of each wire, there was also a problem that freedom of handling the drawn-out section is limited.

Based on the above situation, this invention was completed. An object of this invention is to provide a wire routing member and a wire routing structure capable of improving drawing in and handling freedom of each wire.

The wire routing member of this invention comprises a cylindrical main body that is arranged at an end of an exterior cladding member collectively covering a plurality of wires and has the respective wires inserted therethrough. Partitioning walls that partition routing spaces for the respective wires are provided inside the main body. The respective partitioning walls project in a cantilever shape radially inward from an inner circumferential surface of the main body. The routing spaces partitioned by the partitioning walls are continuous, such that the wires can be inserted via a space at which inner ends of partitioning walls face each other, and the main body includes a split groove through which the respective wires can be inserted into one of the plurality of routing spaces.

By having a plurality of wires inserted into the corresponding routing spaces of the main body, arrangement of each wire is established. Thus, each wire can fit a specified connection counterpart, and connection work can be smoothly performed.

The main body is arranged at an end of an exterior cladding member collectively covering the respective wires. Thus, compared to a case in which the main body is arranged at a tip of the drawn-out section of each wire that is drawn out of the end of the exterior cladding member, a free length (a wire length of a section that is not fixed) of the drawn-out section of each wire can be kept long, and the drawing in and handling freedom of each wire can be improved.

Since the main body has a split groove, and the split groove can be opened and the respective wires can be inserted into the corresponding routing spaces, routing of each wire through the main body can be performed at a final stage of manufacturing steps (assembly step), and workability can be improved.

DETAILED DESCRIPTION OF EMBODIMENTS

The following shows desirable modes of this invention.

It is beneficial if the main body is provided with a tongue piece that protrudes along the drawn-out direction of each of the wire. By having each wire fixed to the tongue piece, a free length of the drawn-out section of each wire is adjusted to a specified length; thus, each wire can accurately fit a connection counterpart, and a situation can be avoided in which misconnection or the like occurs.

Additionally, a wire routing structure of this invention comprises (i) the wire routing member of the above structure, and (ii) a pipe that is connected to an end of the exterior cladding member and is held in the device, and the main body is fit inside the pipe and is provided at its outer circumference with a fixing section that fixes to the pipe. According to this, the main body is provided overlapping with the pipe. Thus, the main body itself does not occupy a place, which provides a spatial advantage, and the structure can be simplified. Additionally, the fixing section suppresses the main body from displacement with respect to the pipe.

It is beneficial if the pipe and the device are made of conductive material and the pipe is comprises a ground pipe connected to a shield member. According to this, the pipe can be provided with both (i) a function of attaching to the device and (ii) a function of having electricity flow to the ground. Thus, the structure can be simplified.

Embodiment 1

The following explains embodiment 1 of this invention with reference to FIGS. 1-7. Embodiment 1 relates to a wire routing structure 10 of a plurality of wires 60 (three high voltage wires here) routed for a hybrid vehicle or the like. As an example, a wire harness is shown that is routed between a device (undepicted) such as a motor mounted at the interior of a vehicle front section and a device (undepicted) such as a battery mounted at the interior of a vehicle back section. A middle section of each wire 60 is routed under the vehicle floor and is inserted through a shield tube (undepicted) made of conductive metal having a specified rigidity.

Figure 5:
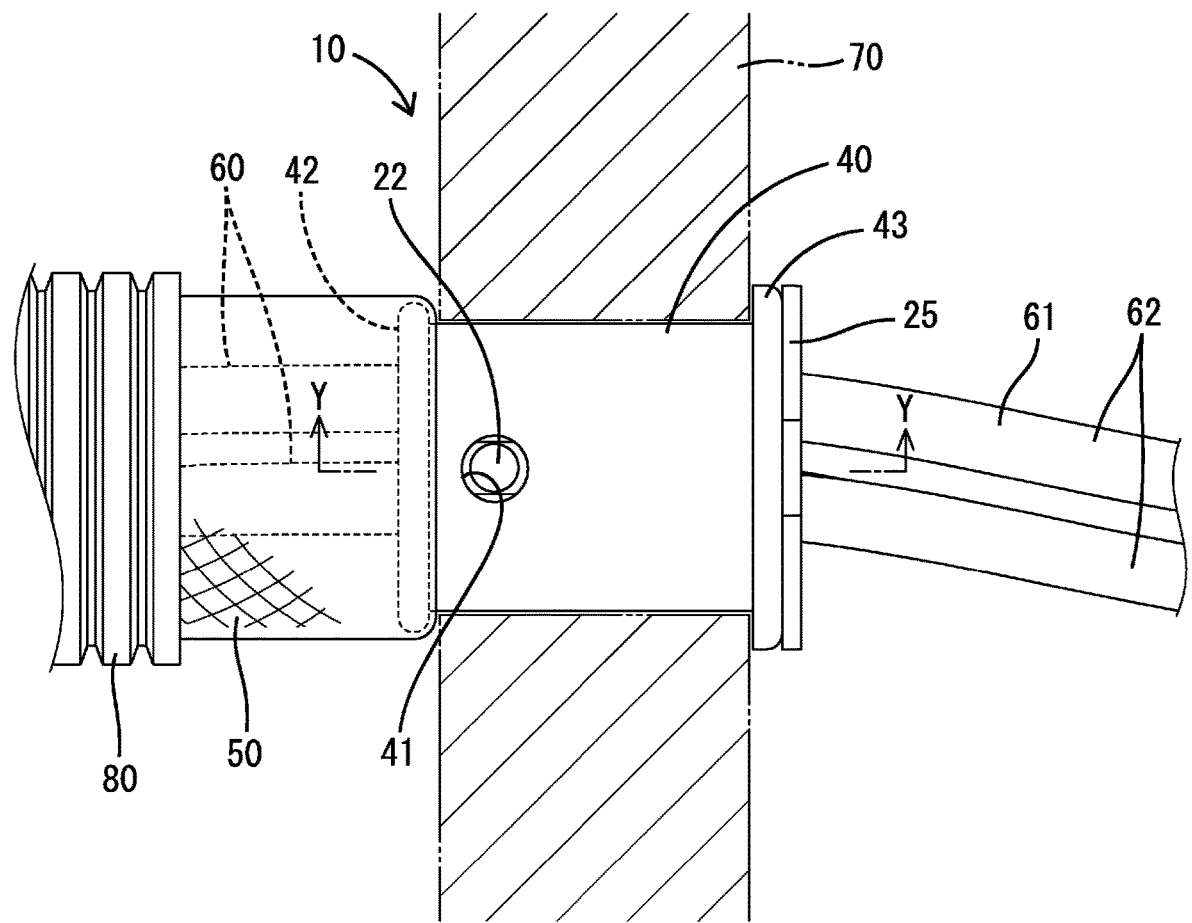
FIG. 5 is a plan view of the wire routing structure fixed to a device.
Figure 6:
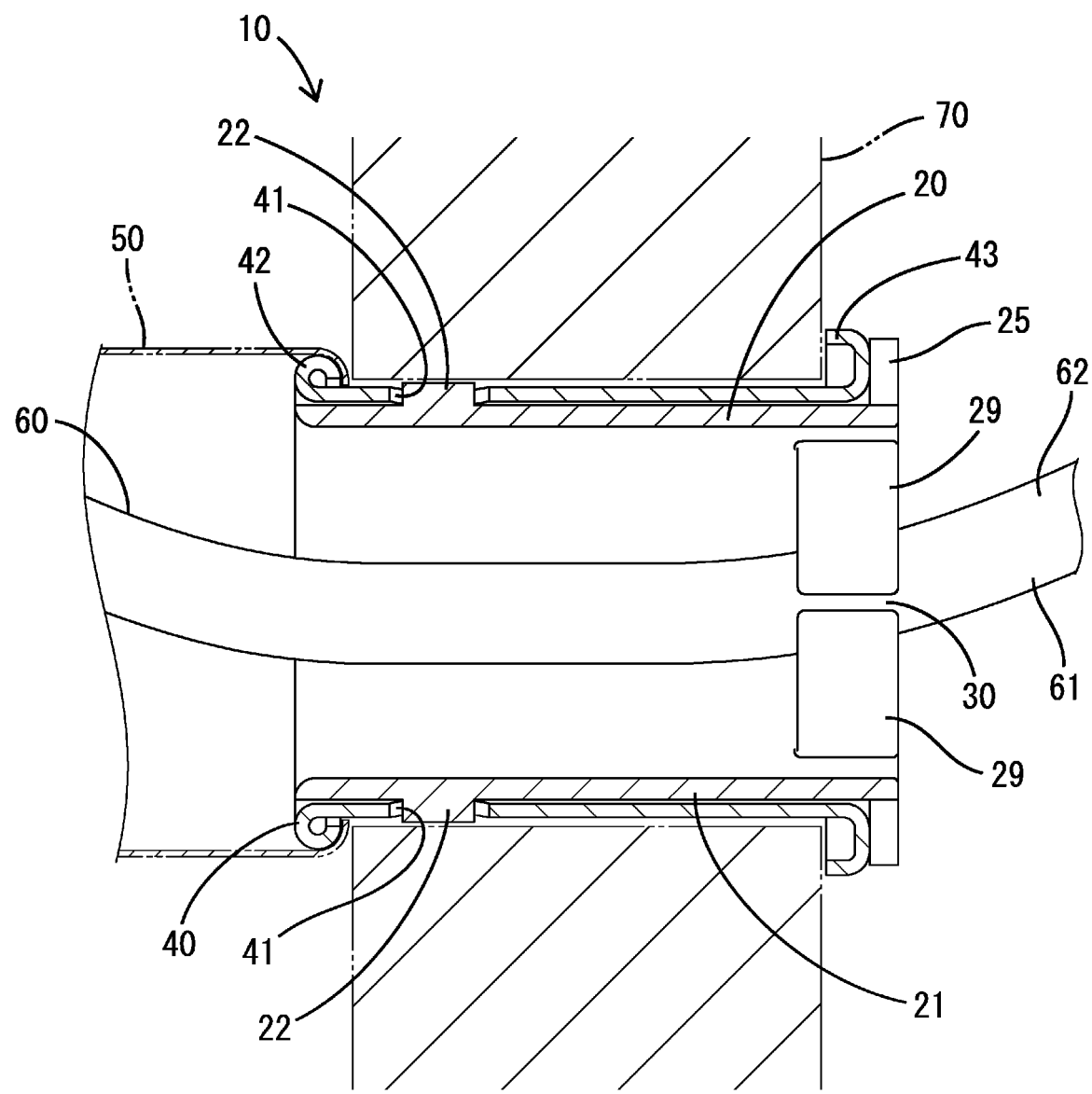
FIG. 6 is a cross-sectional view along line Y-Y of FIG. 5.

The back section of each wire 60 is drawn in to the interior of the vehicle back section. As shown in FIGS. 5 and 6, it is inserted through a cylindrical braided member 50 (shield member, exterior cladding member) in which metal fibers are braided. One end side of the braided member 50 is connected to the shield tube, and another end side of the braided member 50 is connected to a pipe 40 (ground pipe).

The pipe 40 is made of conductive metal, has a circular tube shape, and has a pair of upper and lower circular through holes 41 at positions close to one end. Furthermore, the pipe 40 has flange sections 42 and 43 extending around the entire circumference at both end sides. As shown in FIG. 6, an extending amount of the flange section 42 at one end side is smaller than that of the flange section 43 at the other side and has a curved outer circumferential surface, and the braided member 50 is put along the outer circumferential surface. Details are not depicted, but the braided member 50 is fastened to the pipe 40 with a band or the like. Additionally, the pipe 40 is clamped and fixed to a device 70 (ground member) made of conductive metal.

The braided member 50 is ground connected to the device 70 via the pipe 40. Additionally, as shown in FIG. 5, the braided member 50 is surrounded by a flexible corrugated tube 80 (exterior cladding member). The corrugated tube 80 is in the form of a bellows-like tube that repeats concavities and convexities in an axial direction, is installed between the shield tube and the pipe 40, and is taped or the like (undepicted) and is connected to the shield tube and the pipe 40. The braided member 50 and the corrugated tube 80 can be flexibly bent according to a routing passage of each wire 60 drawn in to the interior of the vehicle back section.

Figure 7:
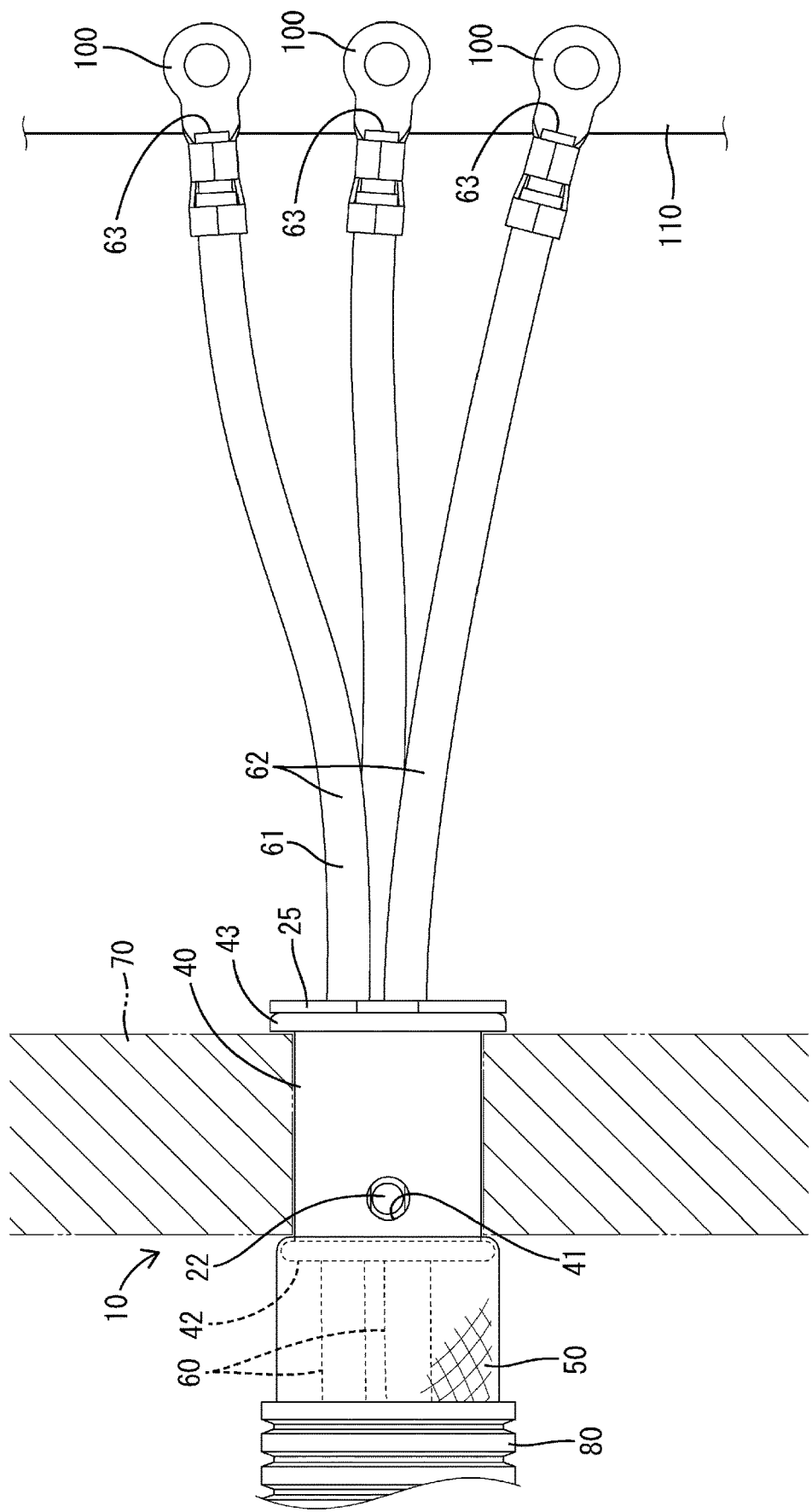
FIG. 7 is a plan view showing a state in which terminal metal fittings connected to ends of wires fit connection counterparts.

Each wire 60 is constituted by (i) a core section 63 using copper or aluminum as a main component and (ii) a coating 61 made of insulating resin surrounding the core section 63. As shown in FIG. 7, at an end of each wire 60, the coating 61 is removed, and the core section 63 is exposed. A terminal metal fitting 100 such as a round terminal (a so-called LA terminal) is crimped and connected to each of the exposed core sections 63. Each terminal metal fitting 100 is electrically connected and fixed to a connection counterpart 110 at the device side via a bolt.

In each wire 60, a section from pipe 40 to the terminal metal fitting 100 is an extending section 62. The extending section 62 has a sufficient length, and handling freedom of each wire is ensured to be high. Furthermore, the various wires 60 are configured to be shielded all together by the braided member 50 and the shield tube.

Figure 1:
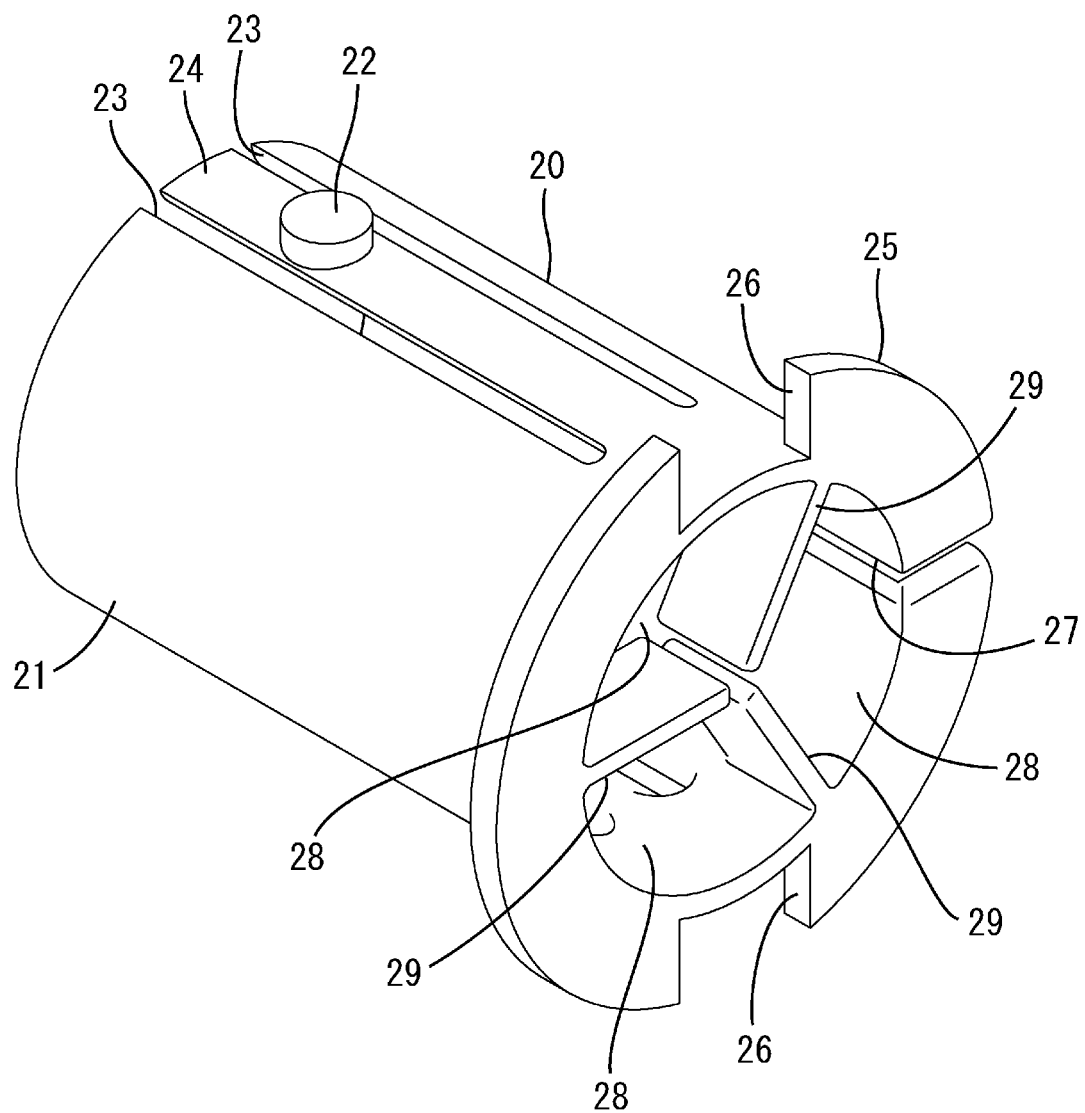
FIG. 1 is a perspective view of a wire routing member of embodiment 1 of this invention.
Figure 2:
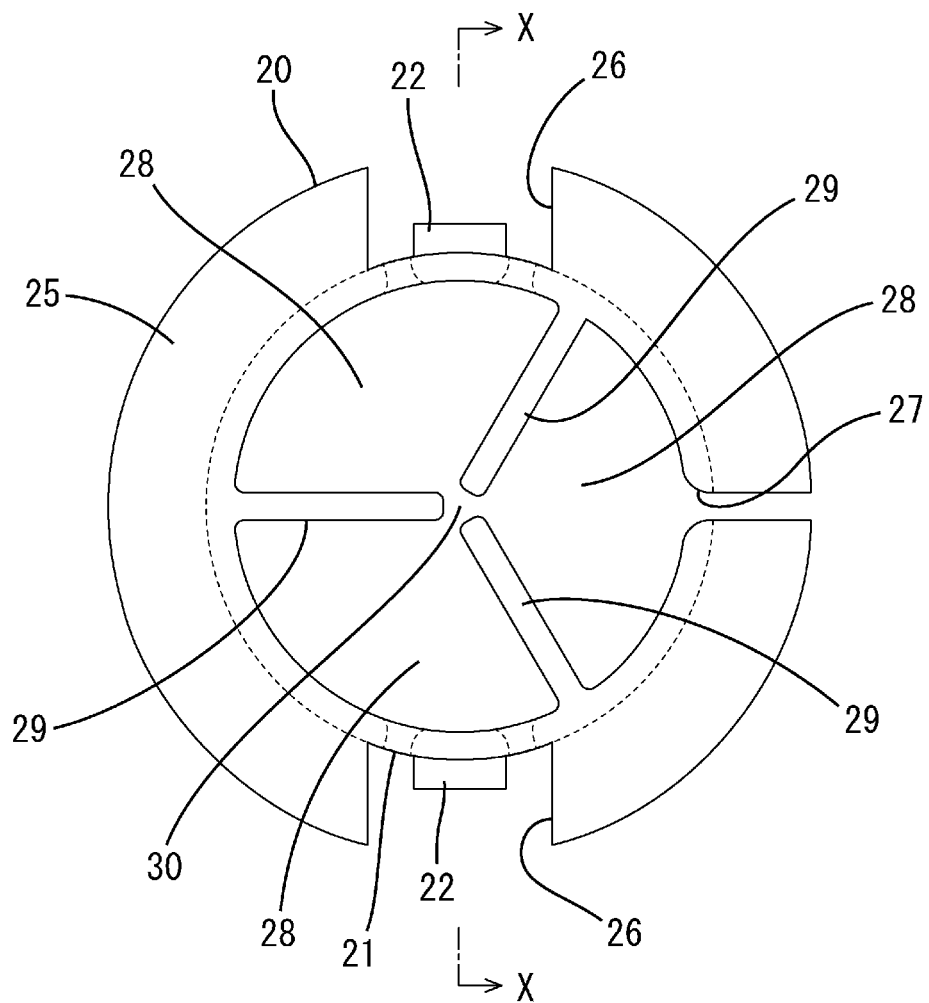
FIG. 2 is a front view of the wire routing member.
Figure 3:
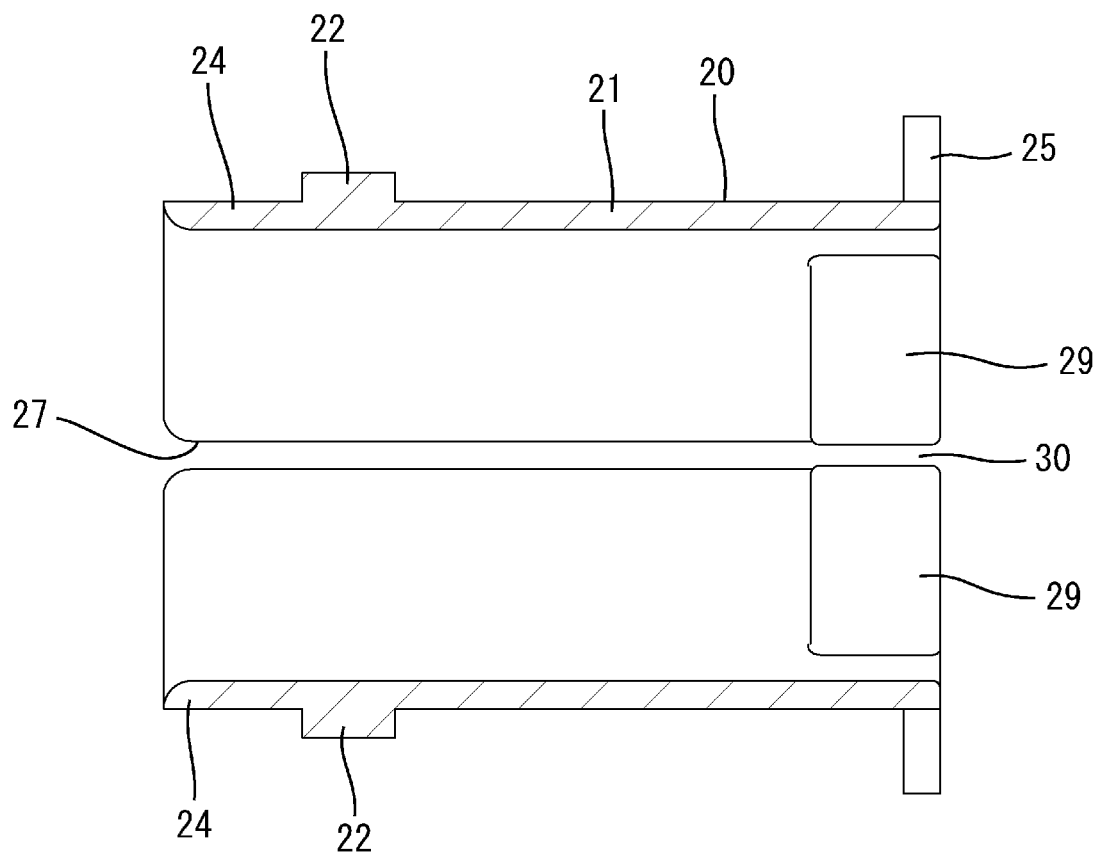
FIG. 3 is a cross-sectional view along line X-X of FIG. 2.

A wire routing member 20 is arranged inside of the pipe 40. The wire routing member 20 is made of synthetic resin. As shown in FIGS. 1-3, it is constituted by a main body 21 that has a cylindrical shape as a whole. As shown in FIG. 6, the overall length of the main body 21 is made to be longer than that of the pipe 40. Furthermore, in the following explanation, the braided member 50 is positioned at one end side of the main body 21, and the extending section 62 of each wire 60 is positioned at the other end side of the main body 21.

The main body 21 has a pair of protruding sections 22 at the top and bottom at positions close to one end of an outer circumferential surface. Each of the protruding sections 22 has a flat cylindrical shape with a relatively small projecting dimension and can be inserted to a respective one of through holes 41 of the pipe 40. As shown in FIG. 1, at both right and left sides (both sides in a circumferential direction) of each of the protruding sections 22, the main body 21 has (i) cut grooves 23 that extend in the axial direction and open at one end of the pipe 40 and (ii) a cantilevered beam-shaped elastic piece 24 between the cut grooves 23 at the right and left sides. Each of the protruding sections 22 is protrudingly arranged at the outer circumferential surface of the elastic piece 24 and is internally fit in a respective one of the through holes 41 after bending the elastic piece 24.

At the other end side of the main body 21, a flange section 25 is projectingly arranged radially outward. As shown in FIG. 2, in the flange section 25, notches 26 are open at sections corresponding to the upper and lower protruding sections 22 in the circumferential direction. The notches 26 are formed because a mold for molding the protruding sections passes through the flange section 25.

Additionally, at one side section equally distant from the upper and lower protruding sections 22 (center in the up-and-down direction), the main body 21 has a split groove 27 that opens in a slit shape over the overall length in the axial direction, including the flange section 25. The main body 21 is configured to be able to be elastically opened (expanded) via the split groove 27. The split groove 27 is constituted to have a groove width smaller than an outer diameter of one wire 60 in a state before the main body 21 is expanded. Additionally, the flange section 25 is continuous in the circumferential direction, excluding the split groove 27 and the upper and lower notches 26.

The main body 21 is provided with (i) three routing spaces 28 into which the respective wires 60 can be individually inserted and (ii) partitioning walls 29 that partition the respective routing spaces 28. One of the three routing spaces 28 is connected to the split groove 27.

The respective partitioning walls 29 have a plate-like shape projecting in a cantilever shape radially inward from the inner circumferential surface of the main body 21. In the case of this embodiment 1, the respective partitioning walls 29 are arranged at an equal interval of 120 degrees in the circumferential direction along lines that extend radially in diameter directions around an inner center 30 of the main body 21. As shown in FIG. 3, at the inner circumferential surface of the main body 21, the respective partitioning walls 29 are arranged at a specified range (within a range that is less than half of the overall length of the main body 21) at one end of the main body 21, and there is no partitioning wall in an area at the other end of the main body 21. Because of this, the respective routing spaces 28 are also arranged only at a specified range on the other end side inside the main body 21.

As shown in FIG. 2, inner ends of the respective partitioning walls 29 face the inner center 30 of the main body 21 and are arranged close to each other. The respective routing spaces 28 are connected to each other via the inner center 30. Furthermore, the respective partitioning walls 29 can be elastically deformed, using a base end at the inner circumferential surface side of the main body 21 as a fulcrum.

Next, a method of assembling the wire routing structure 10, and its operation, are explained.

When the wire routing structure 10 is assembled, each wire 60 is inserted through the braided member 50 and the shield tube, and the extending section 62 of each wire 60 is exposed to the outside from the end of the braided member 50. Subsequently, the split groove 27 of the main body 21 is positioned along the extending section 62 of each wire 60. In that state, each wire 60 is horizontally moved toward the main body 21. Then, the split groove 27 is pressed by the respective wires 60 and is elastically expanded, and the respective wires 60 go through the split groove 27 and enter into one routing space 28. Additionally, the respective wires 60 enter into the corresponding routing spaces 28 via the inner center 30. At this time, as the partitioning walls 29 are elastically deformed, transfer of the respective wires 60 to the routing spaces 28 is thereby allowed. Furthermore, all of the respective wires 60 are transferred to the inside of the main body 21, the split groove 27 elastically returns to the original groove width, and the respective wires 60 are restricted from coming out of the routing spaces 28.

Figure 4:
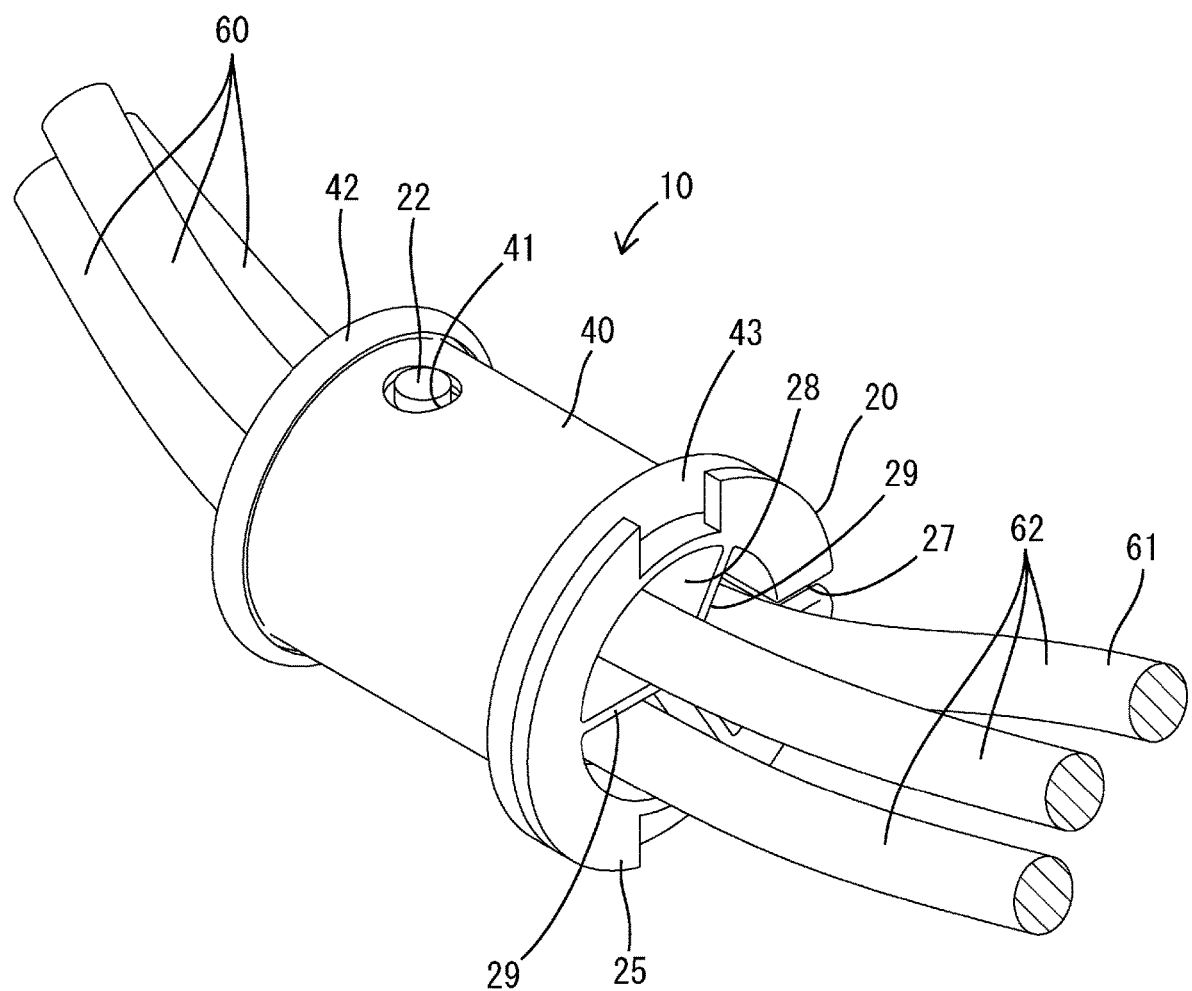
FIG. 4 is a perspective view of a wire routing structure.

Subsequently, the main body 21 is inserted inside of the pipe 40 by inserting one end of the main body 21 into an opening of the pipe 40 (see FIG. 4). In a step of inserting the main body 21, the respective protruding sections 22 slidably move at the inner circumferential surface of the pipe 40, and the respective elastic pieces 24 are elastically deformed. When the main body 21 is inserted to a normal depth, the respective elastic pieces 24 elastically return, and the respective protruding sections 22 enter into the corresponding through holes 41 from the inside in a fitted state. Additionally, the flange section 25 is arranged to be able to abut against the flange section 43 at the other end side of the pipe 40. Thus, the main body 21 is held in a state in which displacement in the circumferential and axial directions inside the pipe 40 is restricted. After that, the braided member 50 is connected to the pipe 40. Furthermore, the pipe 40 is fixed to the device 70 (see FIGS. 5 and 6).

Tip ends of the extending sections 62 of the respective wires 60 extending from the main body 21 are connected to the terminal metal fittings 100 and are connected to connection counterparts 110 at the device side via the terminal metal fittings 100. At this point, the respective wires 60 are aligned in the corresponding routing spaces 28 within the pipe 40, and transfer to other routing spaces 28 is restricted by the partitioning walls 29. Thus, the terminal metal fittings 100 can accurately fit the corresponding connection counterparts 110 (see FIG. 7). Additionally, the extending sections 62 of the respective wires 60 are kept long; thus, connection work between the terminal metal fittings 100 and the connection counterparts 110 can be smoothly performed.

As explained above, according to this embodiment 1, by having a plurality of wires 60 inserted through the corresponding routing spaces 28 of the main body 21, arrangement of the respective wires 60 is established. Thus, the respective wires 60 can fit specified connection counterparts 110, and connection work can be smoothly performed.

Furthermore, the main body 21 is arranged at the end of the braided member 50 (and at the end of a corrugated tube 80, the braided member 50 and the corrugated tube 80 each being an exterior cladding member) that collectively covers the respective wires 60. Thus, compared to a case in which the main body 21 is arranged at tips of the extending sections 62 of the respective wires 60, the free lengths of the extending sections 62 of the respective wires 60 can be kept long, and the drawing in and handling freedom of the respective wires 60 can be improved.

Furthermore, the main body 21 has the split groove 27, and the respective wires 60 can be inserted into the corresponding routing spaces 28 by opening the split groove 27. Thus, routing of the respective wires 60 to the main body 21 can be performed at a final stage after they are inserted into the shield tube and the braided member 50, and workability can be improved.

Additionally, the wire routing structure 10 is connected to (i) the wire routing member 20 and (ii) the pipe 40 that is connected to the end of the braided member 50 and is held in the device 70. The main body 21 is internally fitted to the pipe 40, and is provided, at its outer circumference, with the protruding sections 22 that become fixing sections with respect to the pipe 40. Thus, the main body 21 is provided to overlap with the pipe 40. Thus, there is no need to create a space for the main body 21 itself, which provides a spatial advantage, and the structure can be simplified. Additionally, the protruding sections 22 can suppress the main body 21 from displacement with respect to the pipe 40.

Additionally, the pipe 40 and the device 70 are made of conductive material, and the pipe 40 comprises a ground pipe connected to the braided member 50. Thus, the pipe 40 can be provided with both (i) a function of attaching to the device 70 and (ii) a function of having electricity flow to the ground, and the structure can be simplified.

Embodiment 2

Figure 8:
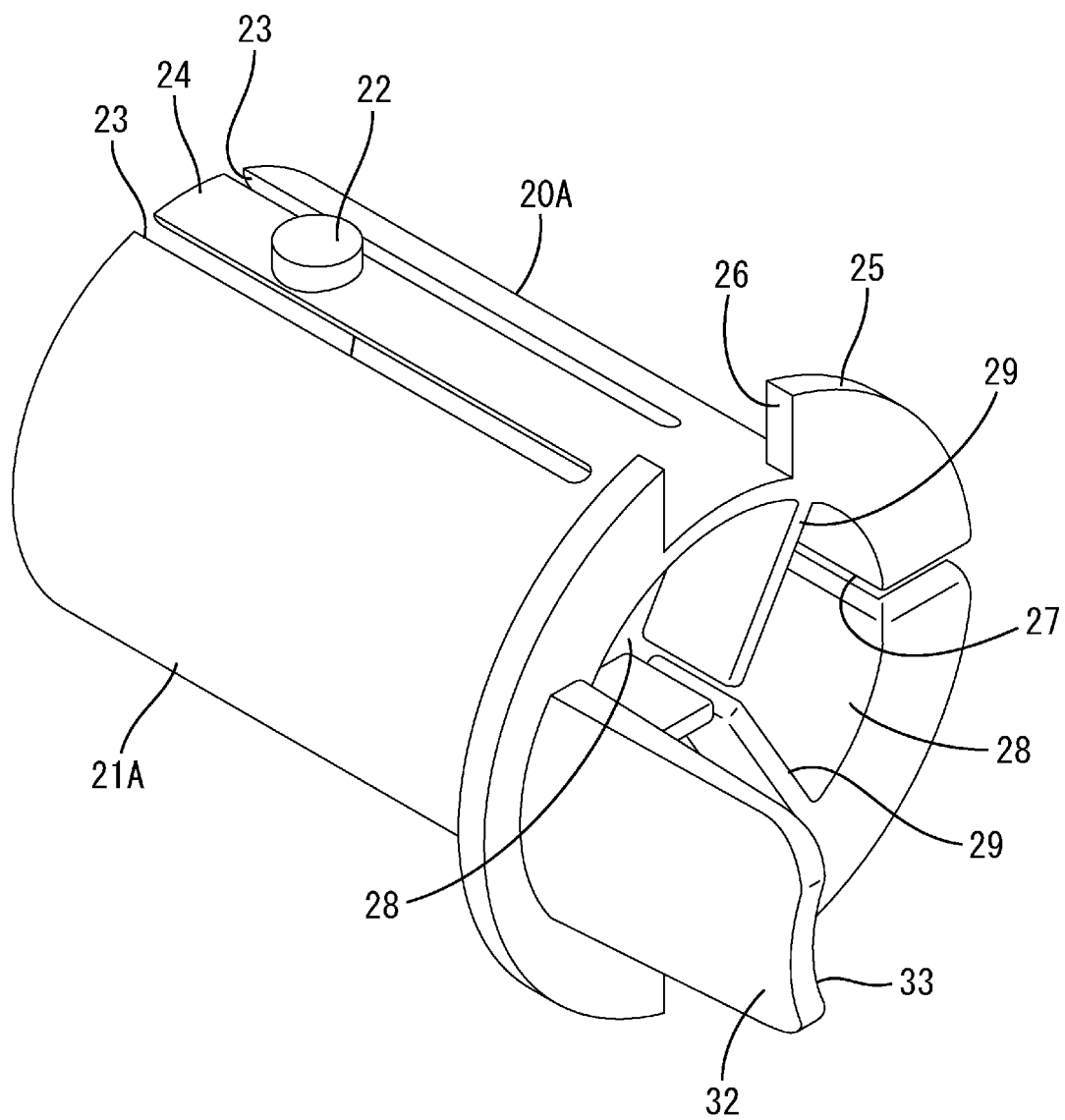
FIG. 8 is a perspective view of a wire routing member of embodiment 2 of this invention.
Figure 9:
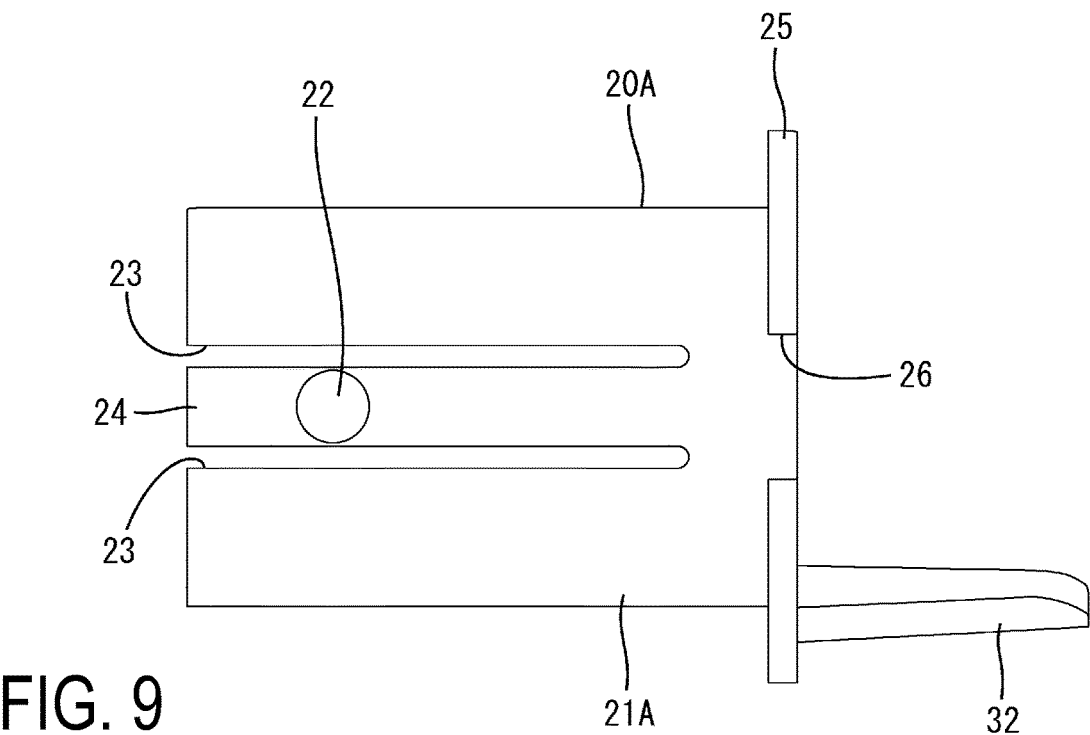
FIG. 9 is a side view of the wire routing member of embodiment 2.
Figure 10:
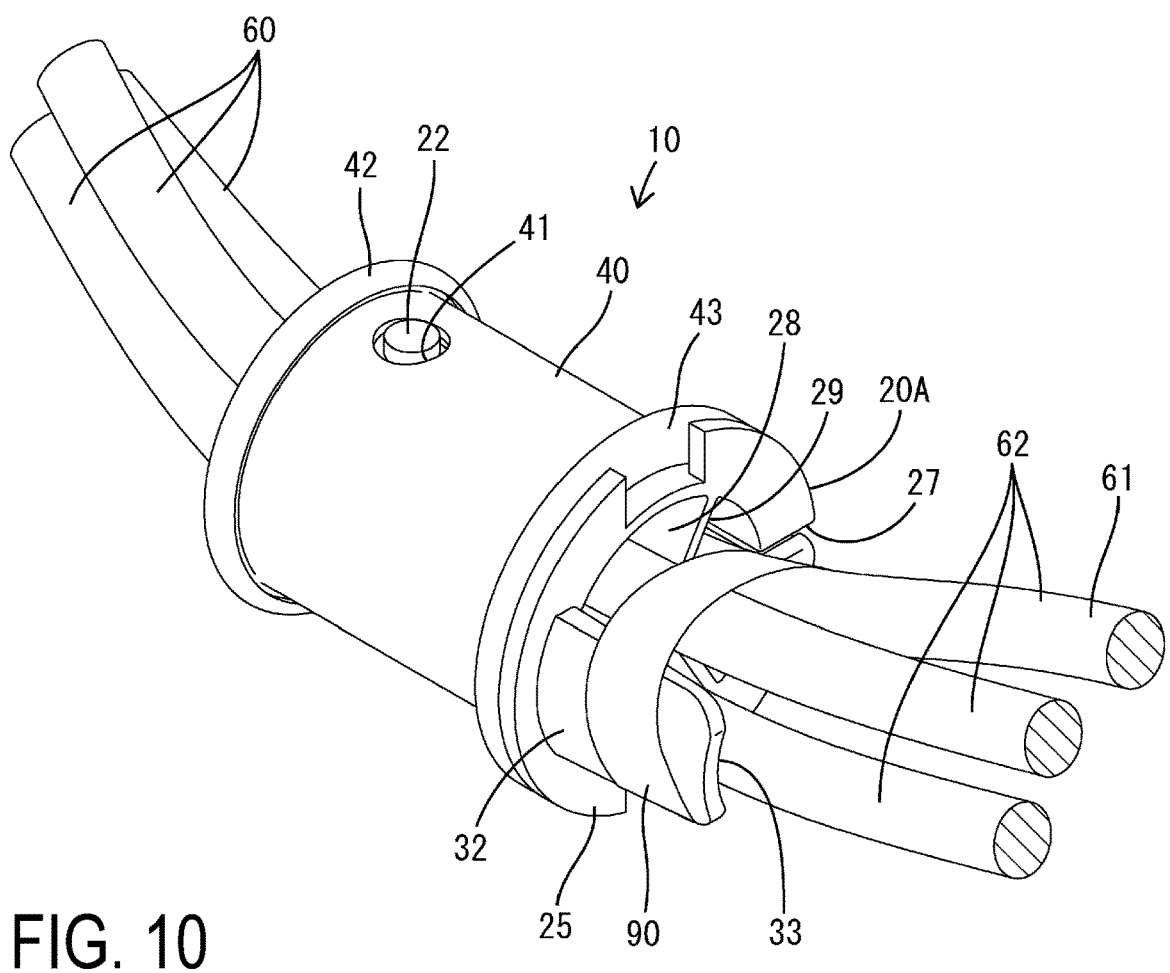
FIG. 10 is a perspective view of the wire routing structure of embodiment 2.

FIGS. 8-10 show embodiment 2 of this invention. A wire routing member 20A of embodiment 2 shows a mode in which a tongue piece 32 is added to the wire routing member 20 of embodiment 1. Other parts are the same as in embodiment 1. The same or corresponding components as or to those of embodiment 1 are denoted by the same reference numerals, and a redundant description will be omitted.

The tongue piece 32 is in a plate form that extends rearward from another end of a main body 21A of the wire routing member 20A. Specifically, the tongue piece 32 is disposed radially inward of the flange section 25 at an end of the main body 21A and at a position radially opposite to the split groove 27. Additionally, the tongue piece 32 is curved in an arc shape along the circumferential direction of the main body 21A, and parts of the respective wires 60 are pressed against a curved surface 33 at an inner side of the tongue piece 32 and are fixed.

Here, in a state in which the respective wires 60 are inserted through the split groove 27 inside the main body 21A and are inserted into the corresponding routing spaces 28, as shown in FIG. 10, a tape 90 is wound around the outer circumference of the respective wires 60 and the tongue piece 32. Thus, the respective wires 60 do not become loose from each other and are fixed to the tongue piece 32 with their movement restricted.

According to embodiment 2, by having the respective wires 60 fixed to the tongue piece 32, the respective wires 60 are restricted from displacement in the axial direction, and thereby the lengths of the extending sections 62 of the respective wires 60 can be maintained at a specified value. As a result, the respective terminal metal fittings 100 provided at the tip ends of the extending sections 62 can more accurately fit the respective connection counterparts 110 at a connection position (see FIG. 7 of embodiment 1), and a situation can be avoided in which misconnection or the like occurs.

Other Embodiments

The following briefly explains other embodiments.

(1) The respective wires can be horizontally or vertically aligned in the respective routing spaces of the main body. In this case, the partitioning walls can be horizontally or vertically arranged, sandwiching the routing spaces.

(2) Two or more wires can be inserted into one routing space of the main body.

(3) The exterior cladding member can be anything that covers the respective wires collectively. For example, it can be a metal foil, a metal pipe, a composite pipe (laminated pipe material of metal and resin), a resin pipe, a rubber tube, or a grommet that is also used as a shield member.

(4) The main body can be fixed to the pipe with some gap provided in the circumferential and axial directions. Thus, an assembly error between the main body and the pipe can be absorbed.

(5) The wire routing member can be made of metal or rubber.

(6) The main body can be constituted by a pair of divided half sections that can be separated from each other. Additionally, both of the divided half sections can be integrated to each other via a hinge.

(7) In embodiment 2, instead of a tape, a band such as a cable tie can be used as a fixing member by which the respective wires are fixed to the tongue piece.

(8) The above-mentioned embodiments 1 and 2 show examples that are applied to high voltage wires for a hybrid vehicle and the like. This invention is not limited to this example, but can be widely applied to other wire harnesses as well.

(9) The main body of the wire routing member can be a structure integrated to the pipe.

EXPLANATION OF SYMBOLS

10 Wire routing structure
20, 20A Wire routing members
21, 21A Main bodies
22 Protruding section
27 Split groove
28 Routing spaces
29 Partitioning walls
32 Tongue piece
40 Pipe
50 Braided member (shield member, exterior cladding member)
60 Wires
70 Device
80 Corrugated tube (exterior cladding member)

What is claimed is:

1. A wire routing member comprising:
a cylindrical main body that is arranged at an end of an exterior cladding member collectively covering a plurality of wires and has the respective wires inserted therethrough, wherein:
partitioning walls that partition routing spaces for the respective wires are provided inside the main body, each partitioning wall projecting in a cantilever shape radially inward from an inner circumferential surface of the main body;
the routing spaces are continuous with each other via a space at which inner ends of the partitioning walls face each other, such that the wires can pass through the space at which the inner ends of the partitioning walls face each other;
the main body includes a split groove through which the wires can be inserted into one of the plurality of routing spaces;
the main body is provided with a tongue piece that protrudes along a drawn-out direction of the respective wires; and
the wire routing member further comprising a fastener that fixes the wires to the tongue piece.

2. A wire routing structure comprising:
the wire routing member according to claim 1, and
a pipe that is connected to an end of the exterior cladding member and is held in a device, wherein:
the main body is internally fit to the pipe and is provided at its outer circumference with a fixing section that fixes to the pipe.

3. The wire routing structure according to claim 2, wherein:
the pipe and the device are made of conductive material, and the pipe comprises a ground pipe connected to a shield member.

4. The wire routing structure according to claim 2, wherein the fixing section comprises a protrusion that engages with a hole in the pipe.

5. The wire routing structure according to claim 2, wherein the protrusion is on a cantilevered elastic piece that deflects relative to a wall of the main body.

* * * * *